United States Patent [19]
Inoguchi et al.

[11] Patent Number: 6,023,373
[45] Date of Patent: Feb. 8, 2000

[54] REFLECTIVE IMAGE DISPLAY APPARATUS

[75] Inventors: Kazutaka Inoguchi, Kawasaki; Shoichi Yamazaki, Yokohama; Hideki Morishima, Kawasaki, all of Japan

[73] Assignee: Mixed Reality Systems Laboratory Inc., Kanagawa-ken, Japan

[21] Appl. No.: 09/158,497

[22] Filed: Sep. 23, 1998

[30]  Foreign Application Priority Data

Mar. 26, 1998 [JP] Japan .................................. 10-098593
Sep. 4, 1998 [JP] Japan .................................. 10-251304

[51] Int. Cl.$^7$ ................................................... G02B 27/14
[52] U.S. Cl. ............................... 359/633; 359/631; 349/11
[58] Field of Search .................................. 359/631, 630, 359/633, 627; 349/11, 113

[56] References Cited

U.S. PATENT DOCUMENTS 5,734,596  3/1998  Williams .................................. 359/633
5,812,323  9/1998  Takahashi ................................ 359/630
5,875,056  2/1999  Takahashi ................................ 359/633

*Primary Examiner*—William L. Sikes
*Assistant Examiner*—Heidi L. Eisenhut
*Attorney, Agent, or Firm*—Fitzpatrick, Cella, Harper & Scinto

[57]  ABSTRACT

The present invention relates to an image display apparatus suitable for a head mounted display which apparatus has been made compact as a whole by the use of a reflection type liquid crystal display element. The apparatus has a first optical element which has an incidence surface on which a light beam is incident, at least two curved reflecting surfaces made eccentric with respect to each other for reflecting the light beam incident from the incidence surface, and an emergence surface from which the light beam from the curved reflecting surfaces emerges. A reflection type image display device provided on the incidence surface side. A light beam from a light source is caused to enter from one of the two curved reflecting surfaces which comprises a half mirror surface, and emerge from the incidence surface and illuminate the image display device. The light beam from the image display device is caused to enter from the incidence surface of the first optical element and be reflected by the curved reflecting surfaces, and thereafter emerge from the emergence surface, and image information displayed by the image display device is observed from the emergence surface side.

19 Claims, 9 Drawing Sheets

REFLECTIVE IMAGE DISPLAY APPARATUS

BACKGROUND OF THE INVENTION

1. Field of the Invention

This invention is suitable for an image display apparatus, and for example, a head mounted display (hereinafter referred to as HMD) or the like designed to enlarge and observe image information displayed on a reflection type liquid crystal display element through an optical element having a free curved surface appropriately set.

2. Related Background Art

There have heretofore been proposed various head mounted type image observation apparatuses, i.e., so-called HMDs using, for example, an optical element provided with an incident surface and a plurality of reflecting surfaces on the surface of a transparent member to enable image information displayed on an image display element such as liquid crystal to be observed as an enlarged virtual image.

Such HMD type image observation apparatuses are proposed, for example, in Japanese Laid-Open Patent Application No. 7-333551, Japanese Laid-Open Patent Application No. 8-179238, Japanese Laid-Open Patent Application No. 8-234137, etc.

Also, there have been proposed various HMDs using, for example, an optical system comprising a plurality of mirrors eccentrically disposed to enable image information displayed on an image display element such as liquid crystal to be observed as an enlarged virtual image. Such HMD type image observation apparatuses are proposed, for example, in Japanese Laid-Open Patent Application No. 7-191274, Japanese Laid-Open Patent Application No. 8-286140, etc.

On the other hand, in recent years, various reflection type liquid crystal display elements have been used as compact display devices. To use a reflection type liquid crystal display element in an image observation apparatus such as HMD, it is necessary to provide an illuminating device and illuminate the liquid crystal display element.

FIGS. 17 and 18 of the accompanying drawings are schematic views of essential portions of image display apparatuses using reflection type liquid crystal display elements according to the prior art.

In FIG. 17, reference numeral 101 designates a. reflection type liquid crystal display element which is illuminated by a light beam from a light source 102 through a half mirror 103. When the apparatus is a projection, image information subjected to light modulation by the liquid crystal display element 101 is projected onto a predetermined surface by a projection lens 104 through the half mirror 103 and is observed. Also, when the apparatus is an HMD, image information displayed by the liquid crystal display element 101 through the lens system 104 is enlarged and observed.

In FIG. 18, a light beam from a light source 102 is made into linearly polarized light (e.g. P-polarized light) through a polarizing plate 106, and is passed through a polarizing beam splitter 105 and illuminates a reflection type liquid crystal display element 101. The light beam (now S-polarized light) subjected to light modulation by the liquid crystal display element 101 is reflected by the polarizing beam splitter 105 and is directed to a projection lens or a lens system 104.

Thereby, when the apparatus is a projector, the light beam is projected onto a predetermined surface by the projection lens 104 and is observed. Also, when the apparatus is an HMD, image information displayed by the liquid crystal display element 101 through the lens system 104 is enlarged and observed.

When a reflection type liquid crystal display element is used as an image display apparatus, it is necessary to incorporate an illuminating device for illuminating it into the apparatus.

When a reflection type liquid crystal display element is used as image display means, it is necessary to incorporate an illuminating device for illuminating it into the optical path of a display optical system, and this has led to the problem that as compared with a case where a transmission type liquid crystal display element or the like is used, the difficulty in designing increases and a reduction in the specification of the angle of view, eye relief or the like is caused.

When the image display apparatus is used for an HMD, it is desired that the entire apparatus be as compact and light in weight as possible to enable it to be mounted on an observer's head.

SUMMARY OF THE INVENTION

The present invention has as its object to provide an image display apparatus which is suitable for a HMD and can be made compact as a whole and yet enables image information displayed by a liquid crystal display element to be observed well by appropriately setting an illuminating device for illuminating the liquid crystal display element when image information displayed by the liquid crystal display element is observed by the use of an optical element using, for example, a reflection type liquid crystal display element as image display means and having integrally formed an incidence surface on which a light beam from the liquid crystal display element is incident, an eccentric curved reflecting surface for reflecting the light beam incident from the incidence surface, and an emergence surface from which the light beam from the curved reflecting surface emerges.

As means for solving the above-noted problem, the image observation apparatus of the present invention is characterized in that (1-1) it has a first optical element having integrally formed an incidence surface on which a light beam is incident, at least two curved reflecting surfaces made eccentric with respect to each other for reflecting the light beam incident from the incidence surface, and an emergence surface from which the light beam from the curved reflecting surfaces emerges, reflection type image display means provided on the incidence surface side, and light source means for causing a light beam to enter from one (Sa) of the two curved reflecting surfaces which comprises a half mirror surface, and emerge from the incidence surface and illuminate the image display means, and the light beam from the image display means is caused to enter from the incidence surface of the first optical element and be reflected by the curved reflecting surfaces, and thereafter emerge from the emergence surface, and image information displayed by the image display means is observed from the emergence surface side.

Particularly, it is characterized in that (1-1-1) the light beam from the image display means is caused to enter from the incidence surface of the first optical element, is totally reflected by the first curved reflecting surface, and is reflected by the second curved reflecting surface, whereafter it is caused to emerge from the emergence surface of a portion of the first curved reflecting surface and is directed to an observer.

It is characterized in that (1-1-2) the light beam from the light source means is caused to enter from the second curved reflecting surface of the first optical element and is totally reflected by the first curved reflecting surface, whereafter it is caused to emerge from the incidence surface and illuminates the image display means.

It is characterized in that (1-1-3) the light source means has a point light source or a surface light source.

It is characterized in that (1-1-4) a second optical element is disposed in opposed relationship with the curved reflecting surface (Sa) of the first optical element, and the light beam from the light source means is caused to enter from the incidence surface of the second optical element, whereafter a part of the light beam is directly directed to the curved reflecting surface Sa, and the remainder of the light beam is reflected by the side reflecting surface of the second optical element, and thereafter is directed to the curved reflecting surface Sa.

It is characterized in that (1-1-5) the light beam from the light source means is caused to enter the incidence surface side of the second optical element through an optical member.

It is characterized in that (1-1-6) the optical member comprises a conical prism, a condensing lens, a diffraction element or a prism sheet.

It is characterized in that (1-1-7) a first polarizing plate is provided between the light source means and the incidence surface of the second optical element, and a second polarizing plate having a polarization axis in a direction orthogonal to the polarization axis of the first polarizing plate is provided on the emergence surface side of the first optical element.

It is characterized in that (1-1-8) the side reflecting surface of the second optical element comprises a half mirror surface, and the light beam from the object information of the external world is caused to enter from the side reflecting surface, whereafter it is caused to emerge from the emergence surface through the curved reflecting surface (Sa) of the first optical element and is directed to the observer, and both of image information displayed by the image display means and the object information are observed in the same field of view at a time.

It is characterized in that (1-2) it has a first optical element having an incidence surface on which a light beam is incident, at least two curved reflecting surfaces made eccentric with respect to each other for reflecting the light beam incident from the incidence surface, and an emergence surface from which the light beam from the curved reflecting surfaces emerges, reflection type image display means provided on the incidence surface side, and light source means for causing a light beam to enter from one (Sa) of the two curved reflecting surfaces which comprises a half mirror surface, and emerge from the incidence surface and illuminates the image display means, and the light beam from the image display means is caused to enter from the incidence surface of the first optical element and is reflected by the curved reflecting surfaces, and thereafter is caused to emerge from the emergence surface and image information displayed by the image display means is observed from the emergence surface side.

Particularly, it is characterized in that (1-2-1) the light beam from the light source means is caused to enter the curved surface (Sa) through an optical member.

It is characterized in that (1-2-2) the curved reflecting surface (Sb) disposed immediately before the emergence surface comprises a half mirror surface, and the light beam from the object information of the external world is directed to the observer through the curved reflecting surface (Sb), and both of the image information displayed by the image display means and the object information are observed in the same field of view at a time.

It is characterized in that (1-3) it has reflection type image display means, a display optical system having a plurality of curved reflecting surfaces for directing a light beam from the image display means to an observer through the plurality of curved reflecting surfaces and causing it to be visually confirmed as an enlarged image by the observer, and illuminating means for illuminating the image display means, and the light beam from the illuminating means is caused to be incident on one (Sa) of the plurality of curved reflecting surfaces which comprises a half mirror surface from the opposite side with respect to the direction of travel of the light beam in the optical path of the display optical system relative to the curved reflecting surface Sa, the light beam illuminates the image display means through a part of the optical path of the display optical system, the reflected light from the image display means is directed to the observer through the display optical system, and image information displayed on the image display means is visually confirmed as an enlarged image.

Particularly, it is characterized in that (1-3-1) when a ray of light passing from the center of the observer's pupil in design through the display optical system to the substantially central position of the image display means is defined as a reference axis L0, the plurality of curved reflecting surfaces constituting the display optical system are disposed eccentrically relative to the reference axis L0.

It is characterized in that (1-3-2) the plurality of curved reflecting surfaces disposed eccentrically relative to the reference axis L0 are rotation-asymmetrical surfaces which are not symmetrical about the reference axis L0.

It is characterized in that (1-3-3) the display optical system is comprised of only a plurality of curved reflecting surfaces.

It is characterized in that (1-3-4) the display optical system is comprised of a plurality of curved reflecting surfaces, and a lens system having a plurality of refracting surfaces.

It is characterized in that (1-3-5) one (Sb) of the plurality of curved reflecting surfaces of the display optical system which finally directs the light beam to the observer's pupil comprises a half mirror surface, the light beam from the object information of the external world is directed to the observer through the curved reflecting surface (Sb), and both of the image information displayed by the image display means and the object information are observed in the same field of view at a time.

DESCRIPTION OF THE PREFERRED EMBODIMENTS

Figure 1:
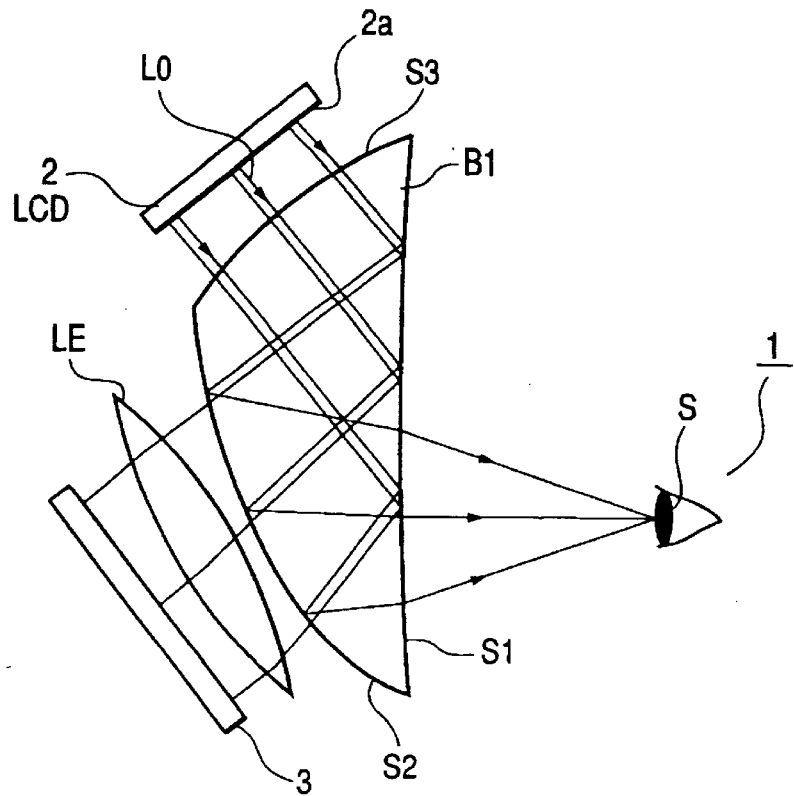
FIG. 1 is a schematic view of the essential portions of Embodiment 1 of the present invention.

FIG. 1 is a schematic view of the essential portions of Embodiment 1 of the image observation optical system of the present invention. In FIG. 1, B1 designates a first optical element having first, second and third optical acting surfaces (hereinafter referred to also as "surfaces") S1, S2 and S3 comprising flat surfaces, curved surfaces, aspherical surfaces or rotation-asymmetrical surfaces. Any of these surfaces is of a symmetrical shape relative to a YZ plane (a symmetry plane, and in the present embodiment, the plane of the drawing sheet corresponds thereto). S denotes the desirable pupil position of an observer 1, reference numeral 2 designates image display means comprising reflection type liquid crystal LCD, and the reference character 2a denotes the display surface thereof.

Reference numeral 3 designates a surface light source, and LE denotes a lens system (illuminating optical system) which condenses a light beam from the surface light source 3 and directs it to the surface S2.

The shape of the third optical acting surface S3 of the first optical element B1 is an aspherical surface symmetrical with respect to the symmetrical surface, and is disposed substantially orthogonally to a reference axis ray of light (reference axis) L0 emerging from the center of the display surface 2a onto the symmetrical surface substantially perpendicularly to the display surface 2a. The shape of the first optical acting surface S1 is a spherical surface or an aspherical surface symmetrical with respect to the symmetrical surface, and the third optical acting surface S3 is so disposed as to be inclined at an angle for totally reflecting the reference axis ray of light L0 refracted thereat.

The second optical acting surface S2 is a half mirror surface (having optical thin film attached to the surface) comprising a sharply concave aspherical surface, and is so disposed as to be inclined with respect to the reference axis ray of light L0 totally reflected by an area of the first optical acting surface S1. The reference axis ray of light L0 reflected by the second optical acting surface S2 is transmitted through the first optical acting surface S1 and arrives at the pupil S.

The optical action of the present embodiment will now be described. The illuminating system in the present embodiment is characterized in that the light beam from the light source 3 enters from the curved surface S2 of the first optical element B1 and illuminates the display surface 2a via the surface S1.

That is, as shown in FIG. 1, the light beam from the surface light source 3 is condensed by the lens system LE and is caused to enter from the surface S2 comprising a half mirror surface and is totally reflected by the surface S1, whereafter it is caused to emerge from the surface S3 and illuminates the reflection type image display means 2.

A light beam emerging from image information displayed by the display surface 2a of the image display means 2 (hereinafter referred to also as the "image information") is first transmitted through the third optical acting surface S3 and travels toward the first optical acting surface S1, and is totally reflected by this surface S1 and travels toward the second optical acting surface S2, and is reflected by this surface S2 and becomes convergent light, and again travels toward the first optical acting surface S1, and now is transmitted through this surface S1 and forms the virtual image of the image information and also arrives at the pupil S of the observer 1, and the observer is made to visually confirm the virtual image of the image information displayed by the liquid crystal display means 2.

In the present embodiment, the elements (S3, S1, S2) which direct the image information displayed by the display surface 2a of the image display means 2 to the pupil of the observer 1 constitute an element or a device of the display optical system. This also holds true in the following embodiments.

Figure 2:
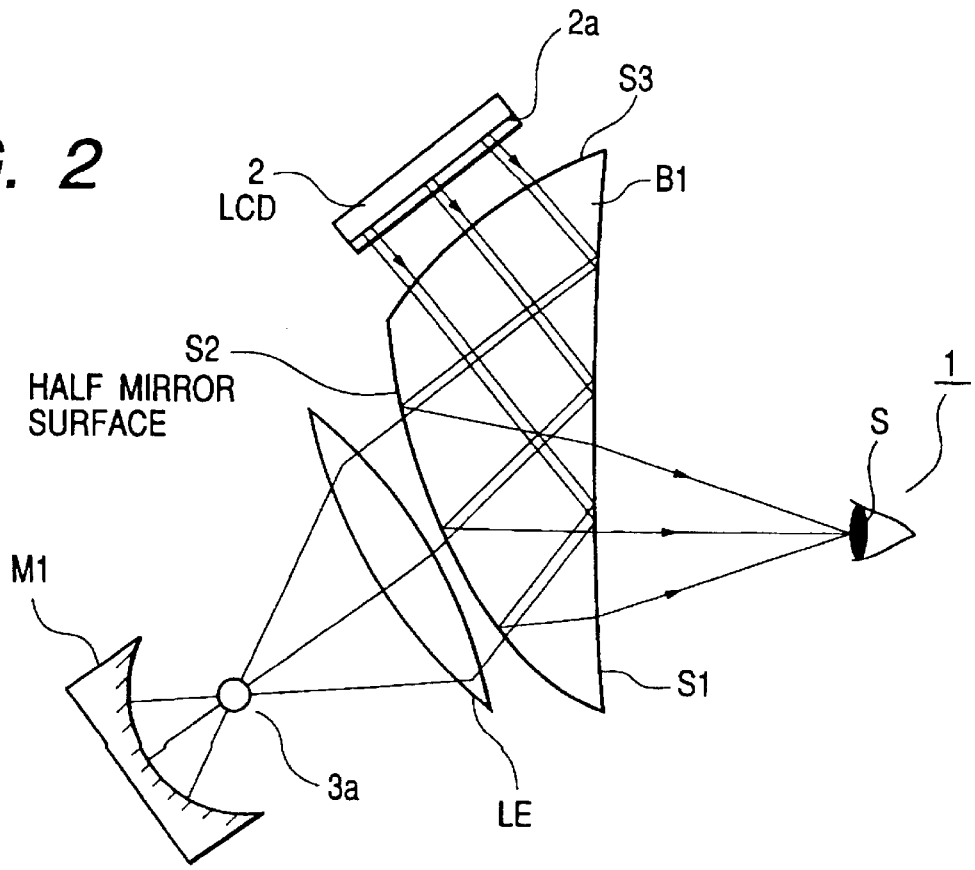
FIG. 2 is a schematic view of the essential portions of Embodiment 2 of the present invention.

FIG. 2 is a schematic view of the essential portions of Embodiment 2 of the present invention. This embodiment differs from the embodiment of FIG. 1 only in that a point light source 3a is used as a light source and a light beam from the point light source 3a is directed to the surface S2 of the first optical element B1 by the use of a reflecting mirror M1 and a lens system LE, whereafter it is totally reflected by a surface S1, emerges from a surface S3 and illuminates the display surface 2a, and in the other points, the construction of this embodiment is the same as that of the FIG. 1 embodiment.

Figure 3:
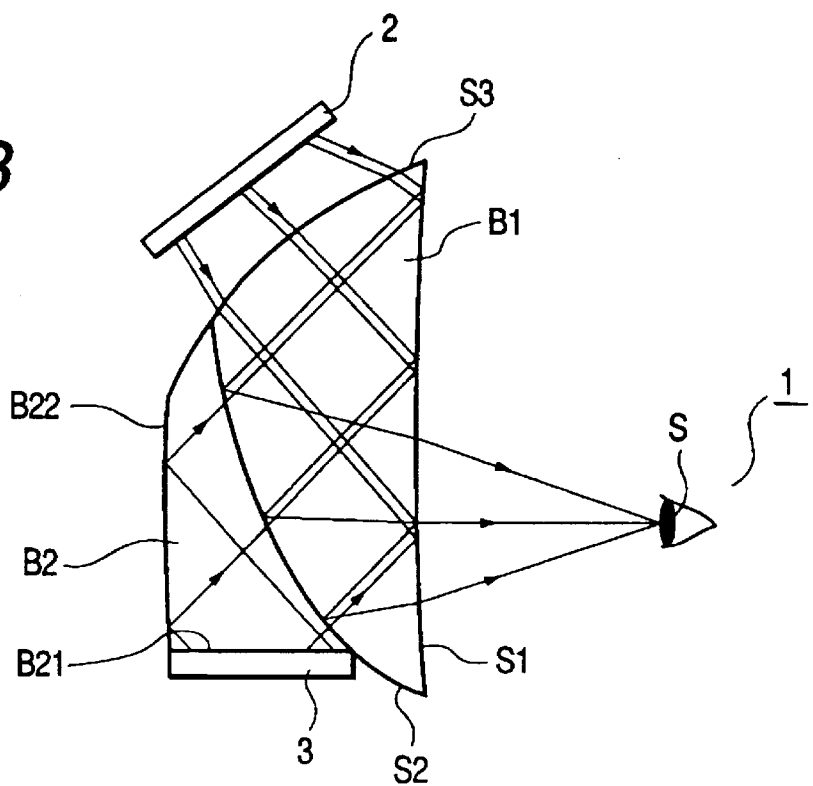
FIG. 3 is a schematic view of the essential portions of Embodiment 3 of the present invention.

FIG. 3 is a schematic view of the essential portions of Embodiment 3 of the present invention. This embodiment differs from the embodiment of FIG. 1 only in that a second optical element B2 is newly provided in opposed relationship with the surface S2 and that the light beam from the surface light source 3 is caused to enter from the incidence surface B21 of the second optical element B2 and the light beam from the incidence surface B21 is reflected directly or by a surface (flat surface or curved surface) B22, whereafter it is directed to the surface S2 of the first optical element B1, and in the other points, the construction of this embodiment is the same as that of the FIG. 1 embodiment.

Figure 4:
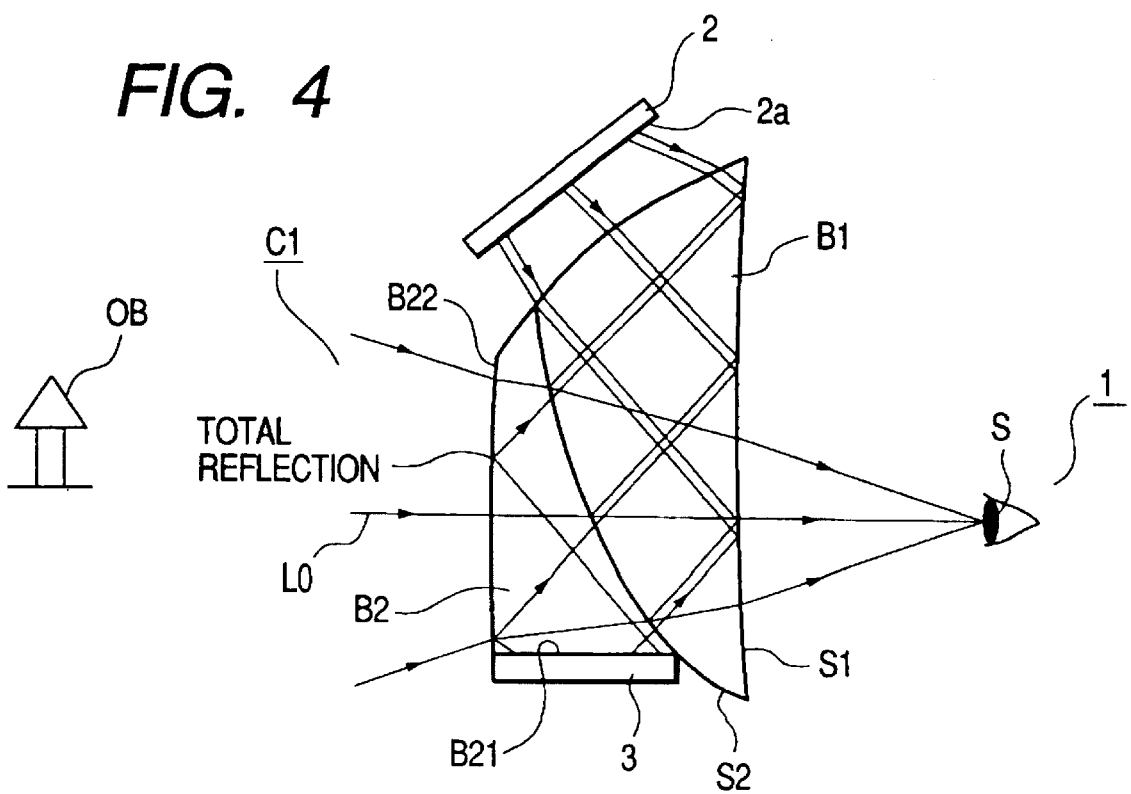
FIG. 4 is a schematic view of the essential portions of Embodiment 4 of the present invention.

FIG. 4 is a schematic view of the essential portions of Embodiment 4 of the present invention. This embodiment differs from the embodiment of FIG. 3 only in that the side surface B22 of the second optical element B2 is a half mirror surface and that both of the image information displayed by the image display means 2 and the image information of the external world (hereinafter referred to also as "object information") are observed in the same field of view at a time, and in the other points, the construction of this embodiment is the same as that of the FIG. 3 embodiment.

That is, this embodiment differs from the embodiment of FIG. 3 only in that the object light LO from an object OB in the external world is directed to a pupil position S through the surface B22 of the second optical element B2, the surface S2 and the surface S1 of the first optical element B1 in succession, that the light beam from the image information displayed by the display surface 2a is directed to the pupil position S through the surface S3, the surface S2 and the surface S1 of the first optical element B1 and that thereby, both of the image information displayed by the display surface 2a and the object information of the external world are observed in the same field of view, and in the other points, the construction of this embodiment is the same as that of the FIG. 3 embodiment. The surface B22, the surface S2 and the surface S1 together constitute a see-through optical system C1.

Figure 5:
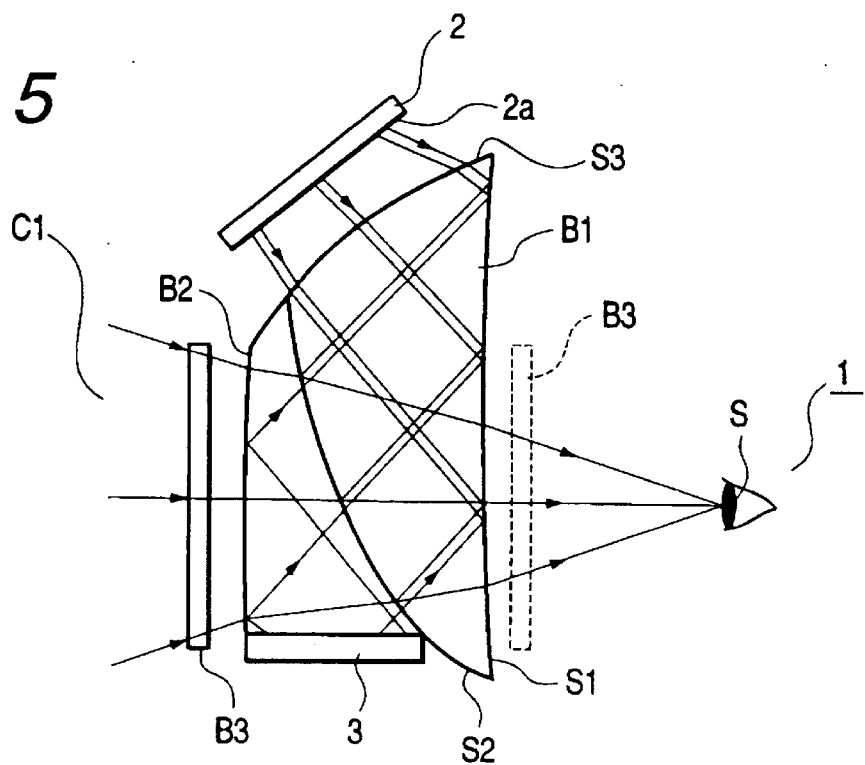
FIG. 5 is a schematic view of the essential portions of Embodiment 5 of the present invention.

FIG. 5 is a schematic view of the essential portions of Embodiment 5 of the present invention. This embodiment differs from the Embodiment 4 of FIG. 4 only in that a third optical element B3 for aberration correction is disposed on the object side of the second optical element B2 or the observation side of the first optical element B1, and in the other points, the construction of this embodiment is the same as that of Embodiment 4.

That is, when the third optical element is provided on the object side of the second optical element B2, aberration correction in the see-through optical system when the object information of the external world is observed is effected. Also, when the third optical element is provided on the observation side of the first optical element B1, aberration correction both when the image information on the display surface 2a is observed and when the object information of the external world is observed is effected.

The third optical element B3 comprises a spherical surface, an aspherical surface, a rotation asymmetrical curved surface or a curved surface having little or no refractive power.

Figure 6:
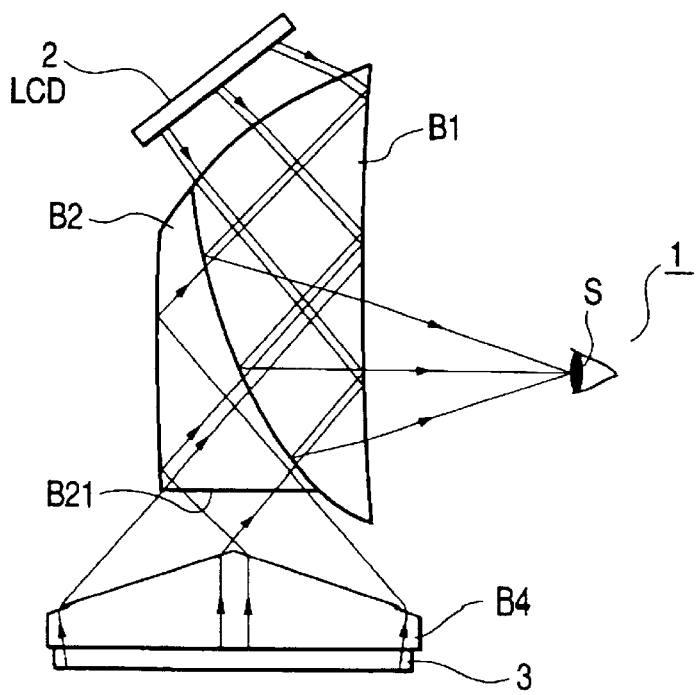
FIG. 6 is a schematic view of the essential portions of Embodiment 6 of the present invention.

FIG. 6 is a schematic view of the essential portions of Embodiment 6 of the present invention. This embodiment differs from the Embodiment 3 of FIG. 3 only in that a fourth optical element B4 is provided between the surface light source 3 and the incidence surface B21 of the second optical element B2, and in the other points, the construction of this embodiment is the same as that of Embodiment 3. The fourth optical element B4 comprises a conical prism, a condensing optical system or the like. FIG. 6 shows a state in which the light beam from the surface light source 3 is caused to enter the incidence surface B21 of the second optical element B2 through the fourth optical element B4 comprising a conical prism.

Figure 7:
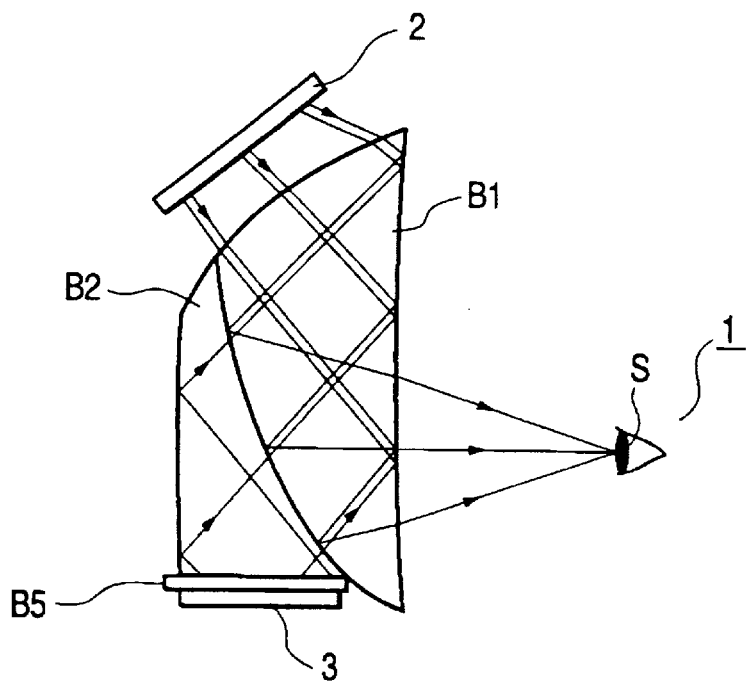
FIG. 7 is a schematic view of the essential portions of Embodiment 7 of the present invention.

FIG. 7 is a schematic view of the essential portions of Embodiment 7 of the present invention. This embodiment differs from the Embodiment 6 of FIG. 6 only in that instead of the fourth optical element, a fifth optical element B5 for light diffusion comprising a diffraction optical element or a prism sheet is used, and in the other points, the construction of this embodiment is the same as that of Embodiment 6.

As the diffraction element, various diffraction elements such as a mechanically engraved diffraction grating, a holographic diffraction grating and a blazed diffraction grating designed such that most of light travels in a desired direction are applicable. Also, as the prism sheet, one in which micro prisms are one-dimensionally arranged on a transparent substrate is applicable.

It is also possible to use a louver element designed such that most of light travels in a desired direction.

Figure 8:
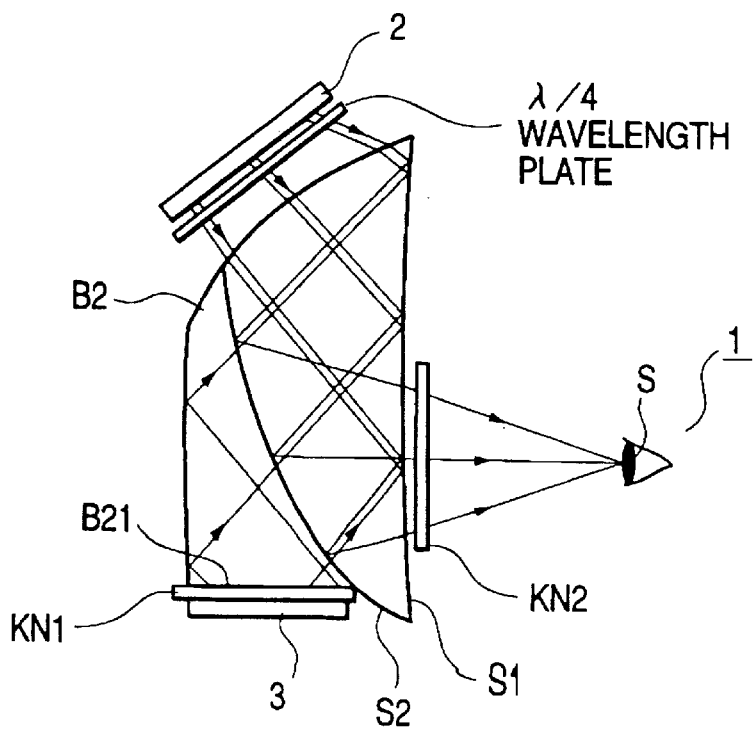
FIG. 8 is a schematic view of the essential portions of Embodiment 8 of the present invention.

FIG. 8 is a schematic view of the essential portions of Embodiment 8 of the present invention. This embodiment differs from the Embodiment 3 of FIG. 3 only in that a first polarizing plate KN1 is disposed between the surface light source 3 and the incidence surface B21 of the second optical element B2 and a second polarizing plate KN2 is disposed between the surface S1 of the first optical element B1 and the pupil position S so that their polarization axes may be orthogonal to each other, and in the other points, the construction of this embodiment is the same as that of Embodiment 3.

By the first and second polarizing plates being disposed so that their polarization axes may be orthogonal to each other, the light beam from the surface light source 3 enters from the incidence surface B21 of the second optical element B2, and noise light directly entering the observer's pupil is intercepted through the surfaces S2 and S1 of the first optical element B1.

Figure 9:
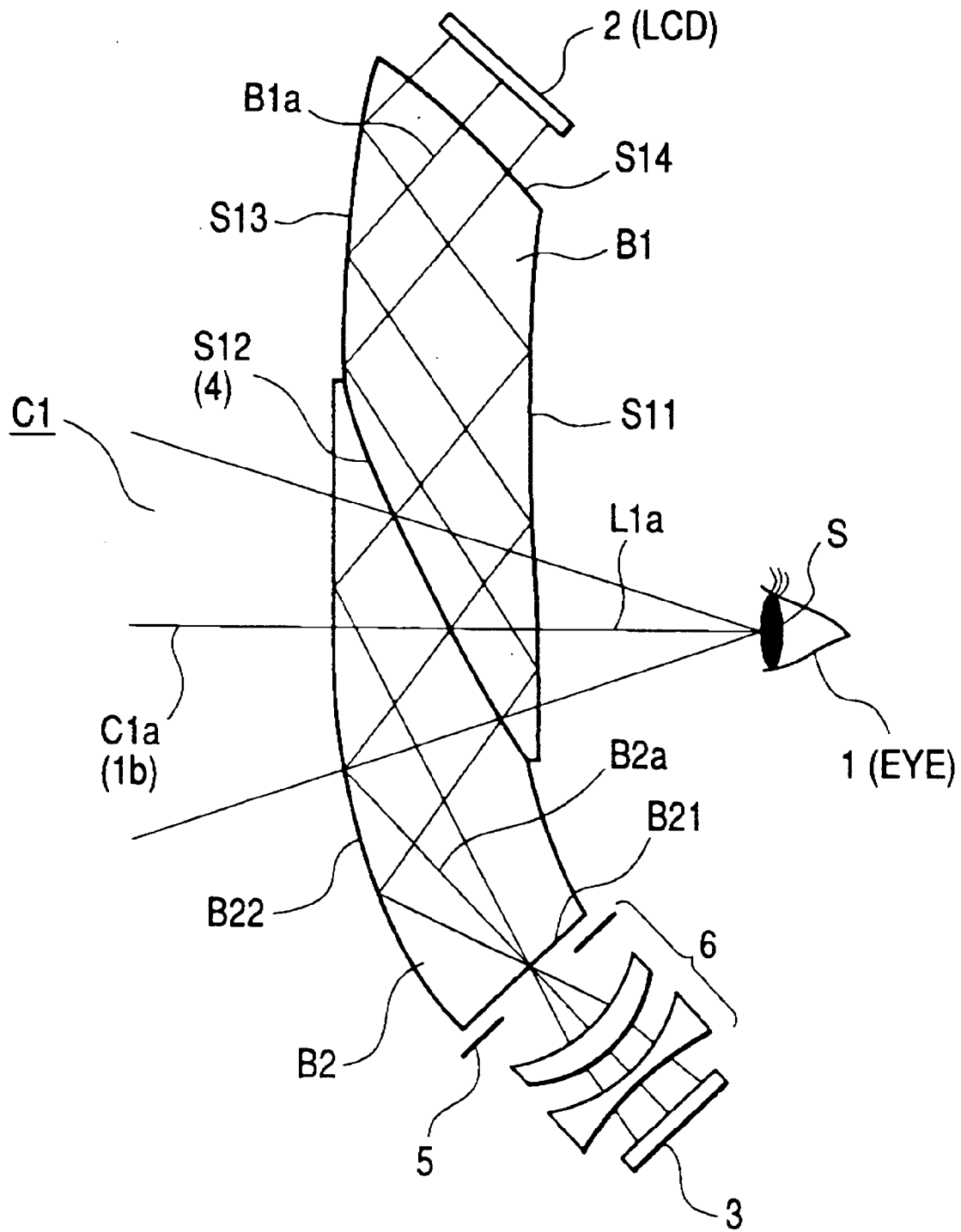
FIG. 9 is a schematic view of the essential portions of Embodiment 9 of the present invention.

FIG. 9 is a schematic view of the essential portions of Embodiment 9 of the present invention. In FIG. 9, B1 designates a first optical element having a plurality of (three) eccentric reflecting surfaces which are eccentric and have a curvature, and directing image information displayed by a liquid crystal display element (LCD) 2 as image display means to the eyeball S of an observer 1. B1a denotes the optical axis of the first optical element B1. B2 designates a second optical element having a plurality of (two) eccentric reflecting surfaces which are eccentric and have a curvature, and directing a light beam from a light source 3 to the surface S12 of the first optical element B1.

In the present embodiment, a plurality of prism members utilizing inner surface reflection are used as both of the first optical element B1 and the second optical element B2. The two prism members are joined together with the surface S12 as optical path dividing members as the boundary. The optical path separating means 4 (S12) comprises a reflecting surface which is eccentric and has a curvature, and is a surface which separates the optical path of the first optical element B1 and the optical path of the second optical element B2 from each other. The optical path separating means 4 (half mirror surface S12) comprises an eccentric reflecting surface.

A light beam from a surface light source 3 is condensed by a condensing optical system 6, and is caused to enter from the incidence surface B21 of the second optical element B2. The light beam is then reflected by a surface B22, whereafter it is caused to enter the surface S12 (half mirror surface) of the first optical element B1, is totally reflected by a surface S11 and is reflected by a surface S13, and is caused to emerge from a surface S14 and illuminates the image display means 2.

Surfaces S11, S12 (half mirror surface), S13 and S14 constituting the elements of the display optical system in the present embodiment comprise free curved surfaces (spherical surfaces, aspherical surfaces or the like including eccentric reflecting surfaces).

The expression of the free curved surfaces in the present invention is not restricted to a particular form, but use can be made of the forms shown, for example, expressions (1), (2), etc. The definition expression of the free curved surface AAL is $$z = \frac{y^2/r_{yi} + x^2/r_{xi}}{1 + [1 - \{(1 + k_{yi})(y/r_{yi})^2 + (1 + k_{xi})(x/r_{xi})^2\}]^{1/2}} +$$
$$AR\{(1 + AP_i)y^2 + (1 - AP_i)x^2\}^2 + BR\{(1 - BP_i)y^2(1 - BP_i)x^2\}^3 +$$
$$CR\{(1 + CP_i)y^2 + (1 - CP_i)x^2\}^4 + DR\{(1 + DP_i)y^2 + (1 - DP_i)x^2\}^5,$$

(1)

($i$ is the number of the surface)

where $b_i$, $c_i$, . . . are anamorphic aspherical surface coefficients. The definition expression of the free curved surface ZAL is $$z = \frac{c(x^2 + y^2)}{1 + (1 - (1 + c_1)c^2(x^2 + y^2)^{1/2}} +$$
$$c_5(x^2 - y^2) + c_6(-1 + 2x^2 + 2y^2) +$$
$$c_{10}(-2y + 3x^2 y + 3y^3) + c_{11}(3x^2 y - y^3) +$$
$$c_{12}(x^4 - 6x^2 y^2 + y^4) + c_{13}(-3x^2 + 4x^4 + 3y^2 - 4y^4) +$$
$$c_{14}(1 - 6x^2 + 6x^4 - 6y^2 + 12x^2 y^2 + 6y^4) +$$
$$c_{20}(3y - 12x^2 y + 10x^4 y - 12y^3 + 20x^2 y^3 + 10y^5) +$$
$$c_{21}(-12x^2 y + 15x^4 y + 4y^3 + 10x^2 y^3 - 5y^5) +$$
$$c_{22}(5x^4 y - 10x^2 y^3 + y^5).$$

(2)

$$c = 1/r$$

The light beam from the image display means 2 enters from the surface 14, is reflected by the surface S13, is totally reflected by the surface S11, is reflected by the surface S12, passes through the surface S11 and enters the eyeball S of the observer 1. Thereby, the image information displayed by the display surface 2a of the image display means 2 is observed.

The object information of the external world is directed to the eyeball S by a see-through optical system C1 comprising the surface B22, the surface S12 and the surface S11 and is superposed on the image information displayed by the image display means 2 and is observed.

The refractive indices of the materials of the prism members of the first and second optical elements B1 and B2 are the same. C1a designates the optical axis (external world optical axis) of the see-through optical system C1.

In the present embodiment, the optical axis B1a of the first optical element B1, the optical axis B2a of the second optical element B2 and the optical axis C1a of the see-through optical system C1 are made coincident with one another at the optical path separating means 4 and are coaxial with the optical axis L1a of the eyeball.

In the present embodiment, each element is set as described above to thereby obtain a compact optical system. The eccentric reflecting surfaces in the present embodiment are made different in refractive power by the azimuth angle about the surface vertex to thereby maintain good optical performance.

In the present embodiment, the first optical element B1 is constituted such that the light from the LCD (display means) 2 enters the incidence surface S14 of the first optical element B1, is reflected by the reflecting surface S13, enters the total reflection surface S11 at an angle of incidence equal to or greater than a critical angle and is totally reflected thereby, is reflected by the optical path separating means 4 (S12), enters the total reflection surface (emergence surface) S11 at an angle of incidence smaller than the critical angle and is transmitted therethrough, and is directed to the eyeball S. As described above, the first optical element B1 reflects the light beam from the LCD 2 two or three times and directs it to the eyeball S without imaging the light beam. Thereby, the image information displayed on the LCD 2 is observed.

The see-through optical system C1 in the present embodiment is constituted such that the light from the external world enters the surface B22 of the second optical element B2, is transmitted through the optical path separating means 4 (S12) (half mirror), enters the surface S11 of the first optical element B1 at an angle of incidence smaller than the critical angle and is transmitted through the surface S11, and is directed to the eyeball S of the observer 1. Thereby, the object information of the external world is observed.

In the present embodiment, the totally reflecting surface and emergence surface S11 of the first optical element B1 comprise the same curved surface, and are properly used depending on the incidence condition of the light beam. Also, the surface B22 of the second optical element B2 on which the light beam from the external world is incident and the totally reflecting surface B22 comprise the same curved surface, and are properly used depending on the incidence condition of the light beam, like the first optical element B1.

In the present embodiment, the first optical element B1 and the second optical element B2 are disposed in opposed relationship with each other by the optical path separating means 4, whereby the eyeball optical axis L1a of the light beam entering the eyeball S or an imaginary eyeball optical axis 1b which is the extension of the eyeball optical axis L1a and the external world optical axis C1a of the light beam entering the see-through optical system C1 from the external world are made substantially coincident with each other so that the observation of the image information displayed on the LCD 2 and the observation (see-through optical system) of the image information of the external world can be done at a time in a state free of parallax.

If the light from the external world is transmitted through the optical path separating means 4 and is directed to the eyeball S and there is the see-through optical system C1 by which the external world can be observed, object information conforming to the situation of the external world is displayed by the image display means 2, and since there is no parallax, information superimposed is made to look as if it was the information of the real world.

Also, the plurality of reflecting surfaces of the first and second optical elements B1 and B2 are reflecting surfaces eccentric and having a curvature, and when the plurality of reflecting surfaces are made eccentric, the disposition of the reflecting surfaces can be done freely and therefore, the present optical system can be made thin. The reflecting surfaces are made not flat but made to have a curvature, whereby it is made possible to eliminate an unnecessary reflecting surface or lens.

Also, the plurality of reflecting surfaces eccentric and having a curvature are made into surfaces differing in refractive power depending on the azimuth angle about the surface vertex (hereinafter referred to as the free curved surfaces, the surface vertex: the vertex 0, 0 in the function expression of the free curved surfaces). On the reflecting surfaces eccentric and having a curvature, rotation-asymmetrical eccentric aberration is created, but this eccentric aberration cannot be suppressed by an ordinary rotation-symmetrical spherical surface or aspherical surface. So, the eccentric aberration is suppressed by free curved surfaces (rotation-asymmetrical) differing in refractive power depending on the azimuth angle about the surface vertex.

In the present embodiment, the light from the LCD 2 enters the first optical element B1, whereafter it is reflected two or three times and emerges from the first optical element B1, and is directed to the eyeball without being imaged, thereby achieving the downsizing of the optical system.

Besides, a prism member including a total reflection surface satisfying a critical condition and having two or more different optical surfaces is used as each of the first and second optical elements B1 and B2. If this total reflection surface serves also as the transmitting emergence surface of the prism member, the light is transmitted or reflected (totally reflected) depending on the angle of incidence onto the surface. Usually a half mirror is used when the action of transmission and the action of reflection are to be given, but the quantity of light decreases. In contrast, in the present embodiment, there is no loss of the quantity of light and the image becomes bright.

The optical path separating means 4 in the present embodiment comprises a reflecting surface eccentric and having a curvature. The optical path separating means 4 is not an eccentric flat surface, but is given a curvature, whereby the first optical element B1 is made small.

Also, the reflecting surface of the optical path separating means 4 is a surface differing in refractive power depending on the azimuth angle about the surface vertex, and corrects created eccentric aberration.

Figure 10:
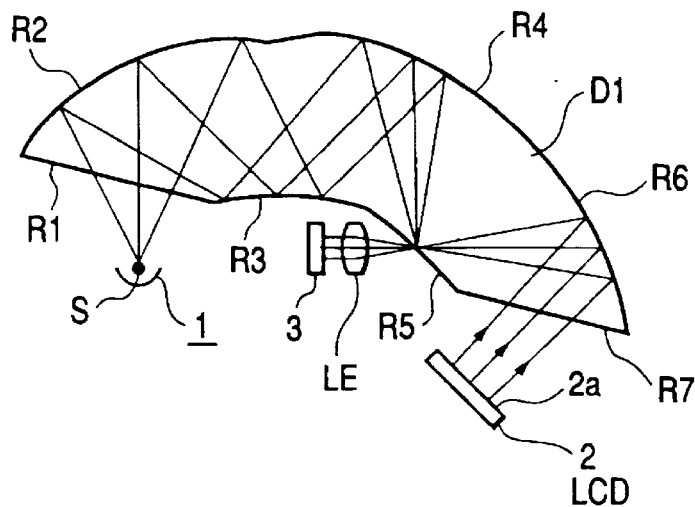
FIG. 10 is a schematic view of the essential portions of Embodiment 10 of the present invention.

FIG. 10 is a schematic view of the essential portions of Embodiment 10 of the present invention. In FIG. 10, D1 designates an optical element comprising a transparent optical member provided with an emergence surface R1, a plurality of eccentric mirrors R2, R3 and R4, a half mirror R5, an eccentric mirror R6 and an incidence surface R7.

A light beam from a point light source or a surface light source 3 is condensed by a condensing optical system LE and is caused to enter from the half mirror surface R5, whereafter it is reflected by the surface R6 and is caused to emerge from the incidence surface R7, and illuminates reflection type image display means 2.

The light beam from the display surface 2a of the image display means 2 enters from the incidence surface R7, is reflected by the reflecting surfaces R6, R5, R4, R3 and R2 in succession, emerges from the emergence surface R1 and enters a pupil position S. Thereby an observer 1 observes image information displayed on the image display means 2.

In the present embodiment, the surface R2 may be made into a half mirror surface so that both of the object information of the external world and the image information on the image display means 2 may be observed in the same field of view at a time. It is desirable to dispose a new optical member for correcting refractive power created in the surfaces R1 and R2 on the external world side of the surface R2 or between the surface R1 and the observer's pupil to thereby correct distortion or the like.

Figure 11:
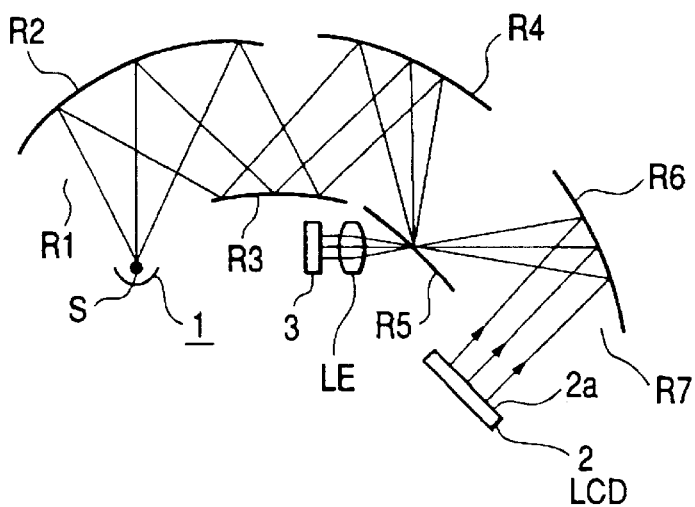
FIG. 11 is a schematic view of the essential portions of Embodiment 10 of the present invention in which a portion is changed.

Also, in the present embodiment, the optical element D1 may be comprised of a hollow member as shown in FIG. 11. That is, in FIG. 11 the surfaces R2, R3, R4 and R6 may be reflecting mirrors (mirror reflecting surfaces), the surface R5 may be a reflecting mirror which is a half mirror surface, and the incidence surface R7 and the emergence surface R1 may be comprised of a member having an imaginary surface or an aperture, or a transparent plane parallel plate.

Also, the surface R2 may be a half mirror surface, and a new optical member for correcting the refractive power of this surface R2 may be disposed near the surface R2 so that both of the object information of the external world and the image information on the image display means 2 may be observed in the same field of view at a time.

Also, in the present construction, the surface R2 may be a half mirror surface and the back of the mirror including the surface R2 may be a transmitting surface having refractive power for correcting the refractive power of the surface R2, it is also possible to design such that the object information of the external world and the image information on the image display means 2 are observed in the same field of view at a time in a state free of distortion and without disposing any new optical member. The eccentric mirrors R2, R3, R4, R6 and the half mirror surface R5 may be constructed discretely from one another or integrally with one another or only a plurality of mirrors may be constructed integrally with one another.

Figure 12:
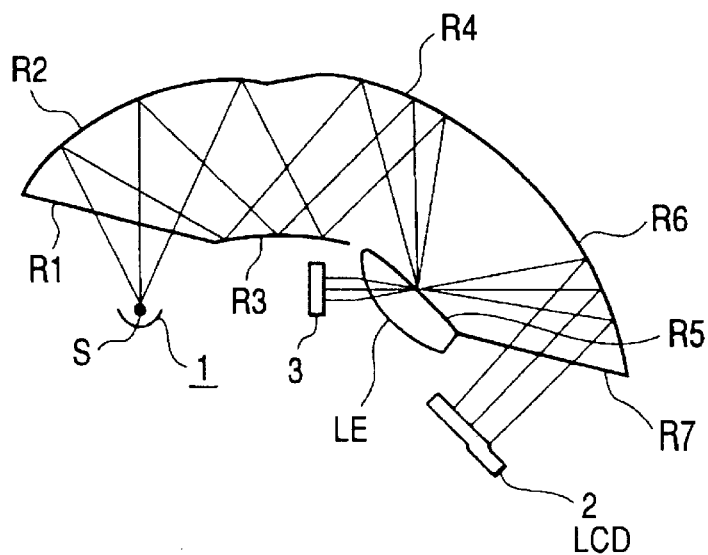
FIG. 12 is a schematic view of the essential portions of Embodiment 11 of the present invention.

FIG. 12 is a schematic view of the essential portions of Embodiment 11 of the present invention.

This embodiment differs from the Embodiment 10 of FIG. 10 only in that the condensing optical system is comprised of an eccentric lens system LE made integral with the half mirror surface R5 and the light beam from the light source 3 is condensed and caused to enter the half mirror surface R5, and in the other points, the construction of this embodiment is the same as that of Embodiment 10.

Figure 13:
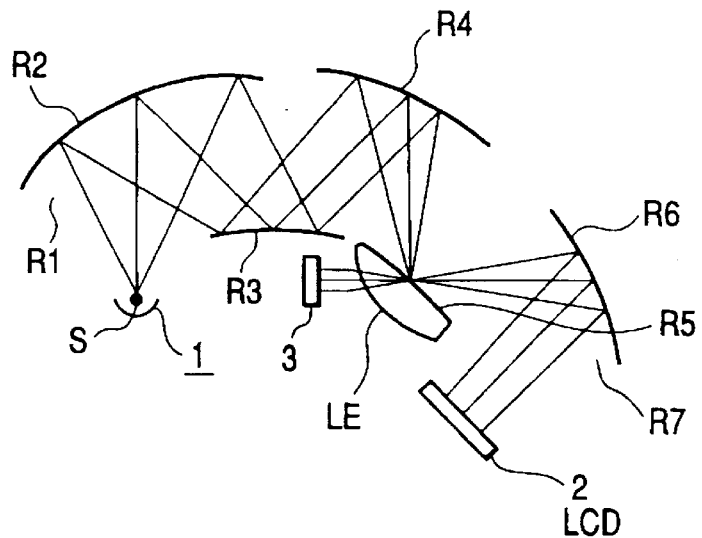
FIG. 13 is a schematic view of the essential portions of Embodiment 11 of the present invention in which a portion is changed.

Again in the present embodiment, similarly to that shown in FIG. 11, the optical element D1 may be comprised of a hollow member as shown in FIG. 13.

Figure 14:
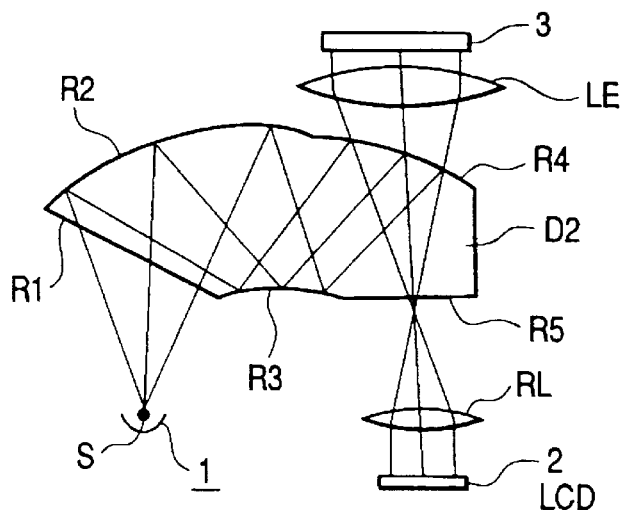
FIG. 14 is a schematic view of the essential portions of Embodiment 12 of the present invention.

FIG. 14 is a schematic view of the essential portions of Embodiment 12 of the present invention. In FIG. 14, D2 designates an optical element comprising a transparent optical member provided with an emergence surface R1, a plurality of eccentric mirrors R2 and R3, a half mirror surface R4 and an incidence surface R5.

A light beam from a point light source or a surface light source 3 is condensed by a condensing lens LE, and is caused to enter from the half mirror surface R4, whereafter it is caused to emerge from the incidence surface R5, is condensed by a relay lens system RL and illuminates image display means 2. The light beam from the image display means 2 is condensed by the relay lens system RL, enters from the incidence surface R5, is reflected by the surfaces R4, R3 and R2 in succession, emerges from the emergence surface R1 and enters a pupil S.

Thereby the observer 1 observes image information displayed on the image display means 2. In the present embodiment, the surface R2 may be a half mirror surface so that both of the object information of the external field and the image information on the image display means 2 may be observed in the same field of view at a time.

It is preferable to dispose a new optical member for correcting refractive power created in the surface R2 on the external world side of the surface R2 or between the surface R1 and the observer's pupil to thereby correct distortion or the like.

Figure 15:
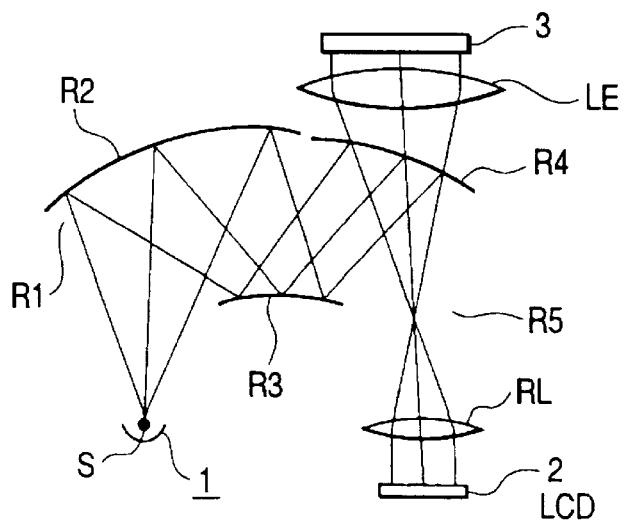
FIG. 15 is a schematic view of the essential portions of Embodiment 12 of the present invention in which a portion is changed.

Again in the present embodiment, an optical element D2 may be comprised of a hollow member as shown in FIG. 15.

That is, in FIG. 15, the surfaces R2 and R3 may be reflecting mirrors (mirror reflecting surfaces), the surface R4 may be a reflecting mirror which is a half mirror surface, and the incidence surface R5 and the emergence surface R1 may be comprised of members having imaginary surfaces or apertures, or a transparent plane parallel plate. RL designates a relay lens system.

Also, the surface R2 may be a half mirror surface, and a new optical member for correcting the refractive power of the surface R2 may be disposed near the surface R2 so that both of the object information of the external world and the image information on the image display means 2 may be observed in the same field of view at a time.

Also, in the present construction, the surface R2 is made into a half mirror surface and the back of a member (mirror) including the surface R2 is made into a transmitting surface for correcting refractive power created in the surface R2, whereby without disposing a new optical member, it is also possible to design such that the object information of the external world is observed in a good state.

Figure 16:
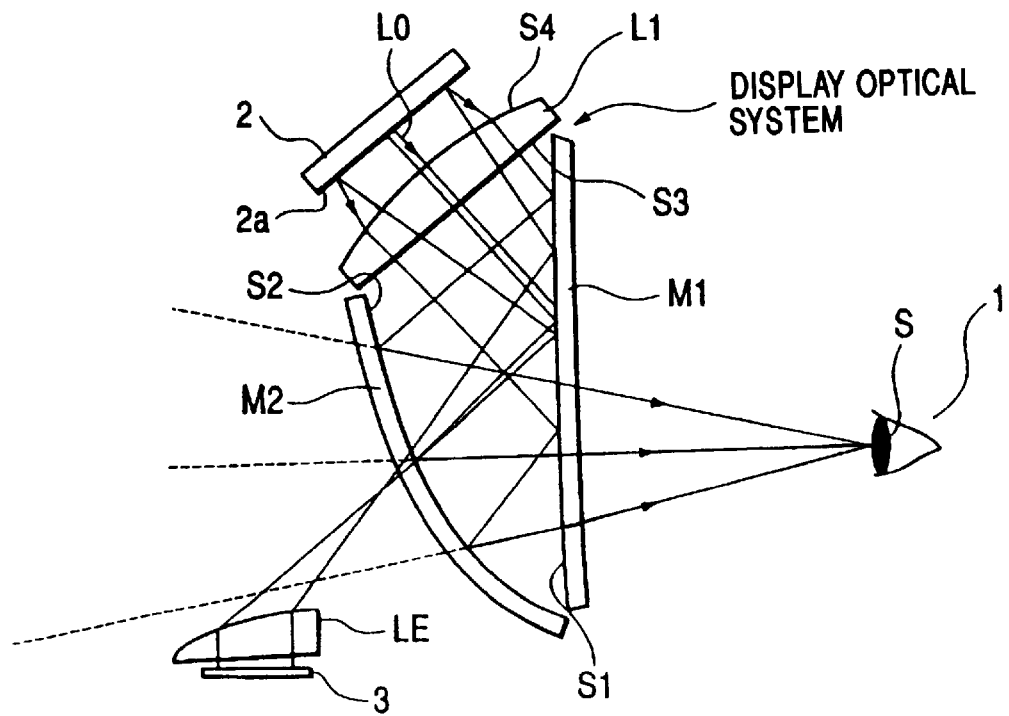
FIG. 16 is a schematic view of the essential portions of Embodiment 13 of the present invention.
Figure 17:
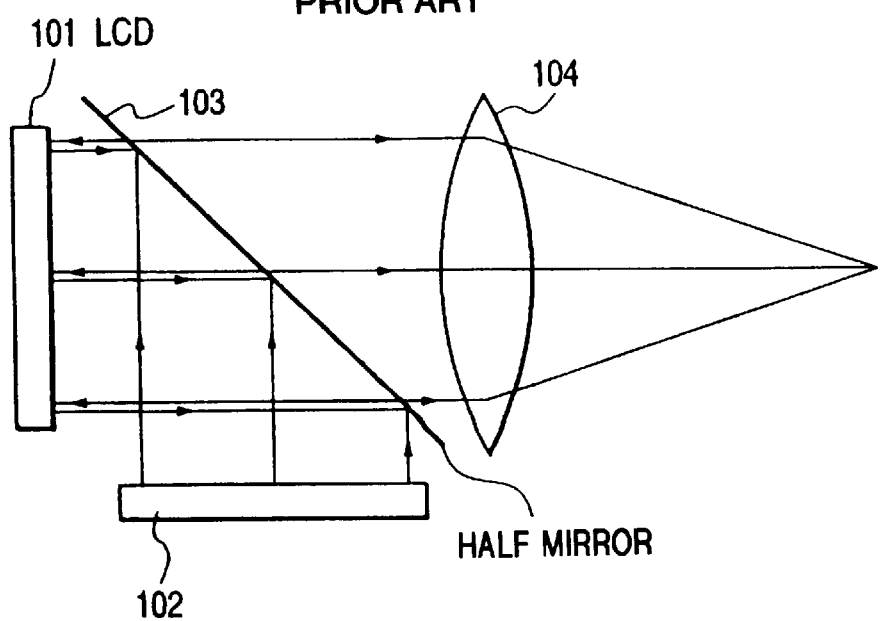
FIG. 17 is a schematic view of the essential portions of an image display apparatus according to the prior art.
Figure 18:
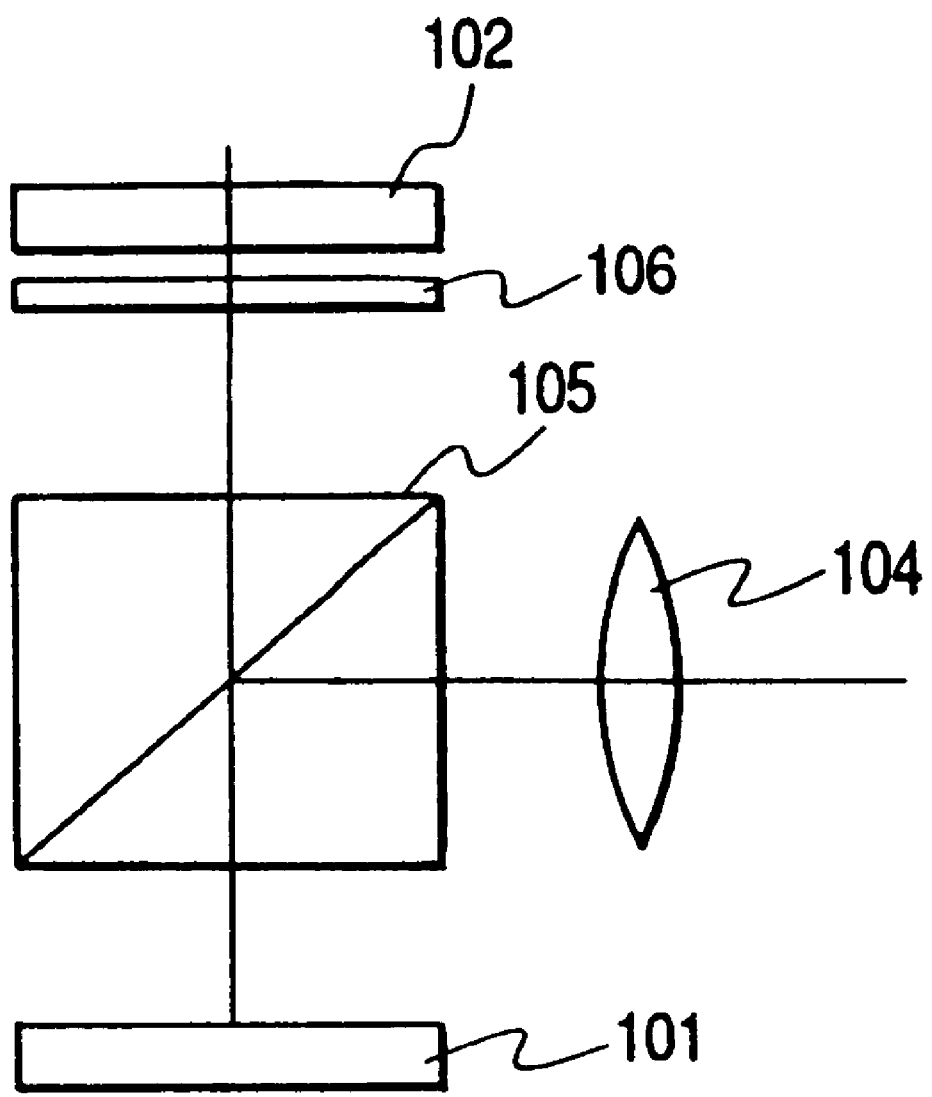
FIG. 18 is a schematic view of the essential portions of an image display apparatus according to the prior art.

FIG. 16 is a schematic view of the essential portions of Embodiment 13 of the present invention. The display optical system in the present embodiment is comprised of a mirror M1, a mirror M2 and a lens L1 discrete from one another, and has first, second, third and fourth optical acting surfaces (hereinafter referred to also as "surfaces") S1, S2, S3 and S4 comprising flat surfaces, curved surfaces, aspherical surfaces or rotation-asymmetrical surfaces. Any of these surfaces is of a shape symmetrical with respect to a YZ plane (a symmetry plane to which the plane of the drawing sheet of FIG. 16 corresponds in the present embodiment). S designates the desirable pupil position of an observer 1, reference numeral 2 denotes image display means comprising reflection type LCD, and reference character 2a designates the display surface thereof.

Reference numeral 3 denotes a surface light source, and LE designates a lens system (illuminating optical system), which condenses a light beam from the surface light source 3 and directs it to the mirror M2 having the surface S2.

The shape of the third and fourth optical acting surfaces S3 and S4 in the lens L1 is an aspherical surface symmetrical with respect to the symmetry plane and is disposed substantially orthogonally to a reference axis ray of light L0 emerging from the center of the display surface 2a onto the symmetry plane substantially perpendicularly to the display surface 2a.

The first optical acting surface S1 of the mirror M1 is a half mirror surface disposed eccentrically relative to a reference axis ray of light L0 passed through the third and fourth optical acting surfaces S3 and S4 in the lens L1, and the shape of the surface S1 is a spherical surface or an aspherical surface symmetrical with respect to the symmetry plane so that the light beam passed through the third and fourth optical acting surfaces S3 and S4 in the lens L1 may be partly reflected and the light beam transmitted therethrough may not enter the pupil S of the observer 1.

The second optical acting surface S2 of the mirror M2 is a half mirror surface (on which optical thin film is provided) comprising an aspherical surface sharply concave as a whole relative to the symmetry plane, and is disposed while being inclined with respect to the reference axis ray of light L0 reflected by an area of the first optical acting surface (half mirror) S1.

The reference axis ray of light L0 reflected by the second optical acting surface (half mirror) S2 is transmitted through the first optical acting surface (half mirror) S1 and arrives at the pupil S.

The optical action of the present embodiment will now be described. The illuminating system in the present embodiment is characterized in that the light beam from the surface light source 3 enters from the back of the mirror M2 and is transmitted through the half mirror surface S2, and is reflected by the surface S1 and illuminates the display surface 2a.

That is, as shown in FIG. 16, the light beam from the surface light source 3 is condensed by the lens system LE and is caused to enter from the surface S2 comprising a half mirror surface and is reflected by the surface S1, whereafter it is passed through the surfaces S3 and S4 of the lens L1 and illuminates the reflection type image display means 2.

A light beam emerging from image information displayed by the display surface 2a of the image display means 2 (hereinafter referred to also as the "image information") is transmitted through the optical acting surfaces S4 and S3 of the lens L1 and travels toward the first optical acting surface (half mirror) S1, and is reflected by this surface S1 and travels toward the second optical acting surface (half mirror) S2, and is reflected by this surface S2 and becomes convergent light, and again travels toward the first optical acting surface (half mirror) S1, and now is transmitted through the surface S1 and back of the mirror M1 and forms the virtual image of the image information and also arrives at the pupil S of the observer 1, and the virtual image of the image information displayed by the image display means 2 is visually confirmed by the observer.

The mirrors M1 and M2 are thin mirror members, and the refractive power of the half mirror surfaces S1 and S2 and backs (transmitting surfaces) thereof is properly disposed, and the refractive power in the whole is rendered into substantially 0 to thereby enable the information of the external world to be observed in a good state, and it is possible to visually confirm the information of the external world and the image information from the LCD 2 in the same field of view.

The light source means used in each of the above-described embodiments may be of any construction. For example, a light emitting diode, a light emitting diode array (emitting a single color light or a plurality of color lights), a white light source or a light source having a plurality of light sources to effect color display, and adapted to produce a plurality of color lights in succession is applicable as the light source means.

Also, one of various types is applicable as the reflection type liquid crystal display element used in each of the above-described embodiments.

For example, as a type which does not require a polarizing plate, the following are applicable:

(a-1) cholesteric nematic phase transition type liquid crystal of a type which uses the light absorption and light transmission by changes in the orientation of a pigment by the use of guest-host liquid crystal comprising a two-color pigment added to cholesteric nematic phase transition liquid crystal (a-2) polymer dispersion type (PDLC type)

liquid crystal utilizing the fact that light scattering occurs due to the difference in refractive index between liquid crystal and polymer (high molecules), and the refractive index of the liquid crystal is made variable by the application of a voltage and the liquid crystal becomes transparent when the refractive indices of the liquid crystal and the polymer become equal to each other.

Also, as a type using a polarizing plate, the following is applicable:

(b-1) electrically controlled birefringence type (ECB type)

liquid crystal in which a voltage applied to a liquid crystal layer is changed to thereby change the inclination of liquid crystal molecules and the resulting change in the birefringence of the liquid crystal layer is detected by a pair of polarizing plates and is applied to color display.

According to the present invention, as described above, there can be achieved an image display apparatus suitable for an HMD which enables image information displayed by a liquid crystal display element to be observed well without causing a reduction in specifications such as a display angle of view, an eye relief length, etc., as compared with a case where for example, a transmission type liquid crystal display element is used as image display means, by appropriately setting an illuminating device for illuminating a liquid crystal display element when for example, a reflection type liquid crystal display element is used as image display means and image information displayed by the liquid crystal element is observed by the use of an optical element in which an incidence surface on which a light beam from the liquid crystal display element is incident, a curved reflecting surface made eccentric for reflecting the light beam incident from the incidence surface, and an emergence surface from which the light beam from the curved reflecting surface emerges are formed integrally with one another.

What is claimed is:

1. An image display apparatus comprising:
   a reflection type image display means;
   a display optical system having a plurality of curved reflecting surfaces for directing a light beam from said image display means to an observer through said plurality of curved reflecting surfaces, so that image information from said image display means can be visually confirmed as an enlarged image by the observer; and
   illuminating means for illuminating said image display means,
   wherein said display optical system is configured so that (i) the light beam from said illuminating means is caused to be incident on one (Sa) of said plurality of curved reflecting surfaces which comprises a half mirror surface, from a first side, (ii) the light beam passes through a part of an optical path of said display optical system to illuminate said image display means, and (iii) light reflected from said image display means travels toward a second side of the one curved reflecting surface that is opposite to the first side and the reflected light is directed to the observer through said display optical system, so that image information displayed on said image display means can be visually confirmed as an enlarged image.

2. An image display apparatus according to claim 1, wherein said display optical system includes a first optical element which has an incidence surface on which a light beam from said image display means is incident, at least two curved reflecting surfaces made eccentric with respect to each other for reflecting the light beam incident from the incidence surface, and an emergence surface from which the light beam reflected by said curved reflecting surfaces emerges, wherein said incidence surface, said reflecting surfaces, and said emergence surface are integrally formed in said first optical element, and the one curved reflecting surface (Sa) comprising the half mirror surface on which the light beam from said illuminating means is caused to be incident is one of said at least two curved reflecting surfaces.

3. An image display apparatus according to claim 2, wherein the light beam from said image display means is caused to enter from the incidence surface of said first optical element, is totally reflected by the first curved reflecting surface, and is reflected by the second curved reflecting surface, whereafter it is caused to emerge from the emergence surface of a portion of said first curved reflecting surface and is directed to an observer.

4. An image display apparatus according to claim 2, wherein the light beam from said light source means is caused to enter from the second curved reflecting surface of said first optical element and is totally reflected by the first curved reflecting surface, whereafter it is caused to emerge from the incidence surface and illuminates the image display means.

5. An image display apparatus according to claim 2, wherein said light source means has a point light source or a surface light source.

6. An image display apparatus according to claim 3, wherein said light source means has a point light source or a surface light source.

7. An image display apparatus according to claim 4, wherein said light source means has a point light source or a surface light source.

8. An image display apparatus according to claim 2, wherein a second optical element is disposed in opposed relationship with the curved reflecting surface (Sa) of said first optical element, and the light beam from said light source means is caused to enter from an incidence surface of said second optical element, whereafter a part of the light beam is directly directed to said curved reflecting surface, and the remainder of the light beam is reflected by the side reflecting surface of said second optical element, and thereafter is directed to said curved reflecting surface Sa.

9. An image display apparatus according to claim 8, wherein the light beam from said light source means is caused to enter the incidence surface side of said second optical element through an optical member.

10. An image display apparatus according to claim 9, wherein said optical member comprises at least one of a conical prism, a condensing lens, a diffraction element and a prism sheet.

11. An image display apparatus according to claim 8, wherein a first polarizing plate is provided between said light source means and the incidence surface of said second optical element, and a second polarizing plate having a polarization axis in a direction orthogonal to the polarization axis of said first polarizing plate is provided on the emergence surface side of said first optical element.

12. An image display apparatus according to claim 9, wherein a first polarizing plate is provided between said light source means and the incidence surface of said second optical element, and a second polarizing plate having a polarization axis in a direction orthogonal to the polarization axis of said first polarizing plate is provided on the emergence surface side of said first optical element.

13. An image display apparatus according to claim 10, wherein a first polarizing plate is provided between said light source means and the incidence surface of said second optical element, and a second polarizing plate having a polarization axis in a direction orthogonal to the polarization axis of said first polarizing plate is provided on the emergence surface side of said first optical element.

14. An image display apparatus according to claim 8, 9, 10, 11, 12, or 13, wherein the side reflecting surface of said second optical element comprises a half mirror surface, and the light beam from the object information of the external world is caused to enter from said side reflecting surface, whereafter it is caused to emerge from the emergence surface through the curved reflecting surface of the first optical element and is directed to the observer, and both of image information displayed by said image display means and said object information are observed in the same field of view at a time.

15. An image display apparatus according to claim 1, wherein when a ray of light passing from the center of the observer's pupil in design through said display optical system to the substantially central position of said image display means is defined as a reference axis L0, the plurality of curved reflecting surfaces constituting said display optical system are disposed eccentrically relative to said reference axis L0.

16. An image display apparatus according to claim 15, wherein the plurality of curved reflecting surfaces disposed eccentrically relative to said reference axis L0 are rotation-asymmetrical surfaces which are not symmetrical about said reference axis L0.

17. An image display apparatus according to claim 15, wherein said display optical system is comprised of only a plurality of curved reflecting surfaces.

18. An image display apparatus according to claim 1, wherein said display optical system is comprised of a plurality of curved reflecting surfaces, and a lens system having a plurality of refracting surfaces.

19. An image display apparatus according to any one of claims 16 to 18, wherein one (Sb) of the plurality of curved reflecting surfaces of said display optical system which finally directs the light beam to the observer's pupil comprises a half mirror surface, the light beam from the object information of the external world is directed to the observer through said curved reflecting surface (Sb), and both of the image information displayed by said image display means and said object information are observed in the same field of view at a time.

* * * * *

UNITED STATES PATENT AND TRADEMARK OFFICE
CERTIFICATE OF CORRECTION

PATENT NO. : 6,023,373

DATED : February 8, 2000

INVENTOR(S): KAZUTAKA INOGUCHI, ET AL.    Page 1 of 2

It is certified that error appears in the above-identified patent and that said Letters Patent is hereby corrected as shown below:

ASSIGNEE [73]

"Kanagawa-ken" should read --Yokohama-shi--.

COLUMN 1

Line 42, "a." should read --a--.

COLUMN 9

Line 1. "expressions (1)," should read --in expressions (1),--.

COLUMN 12

Line 15, close up right margin.
Line 16, close up left margin.

UNITED STATES PATENT AND TRADEMARK OFFICE
CERTIFICATE OF CORRECTION

PATENT NO. : 6,023,373

DATED : February 8, 2000

INVENTOR(S): KAZUTAKA INOGUCHI, ET AL.

It is certified that error appears in the above-identified patent and that said Letters Patent is hereby corrected as shown below:

COLUMN 15

Line 2, "where" should read --where,--.
    Line 4, "when" should read --when,--.

Signed and Sealed this

Seventeenth Day of April, 2001

*Attest:*

NICHOLAS P. GODICI

*Attesting Officer*     Acting Director of the United States Patent and Trademark Office